Nov. 17, 1970 B. L. FLUR ET AL 3,540,864

MAGNETIC COMPOSITION

Original Filed Nov. 15, 1965 3 Sheets-Sheet 1

| | Ni | Fe | Mn |
|---|---|---|---|
| A | 81 | 16 | 3 |
| B | 80 | 15 | 5 |
| C | 78 | 14 | 8 |
| D | 76 | 12 | 12 |

INVENTORS
BARRY L. FLUR
ANDREW J. GRIEST

BY

Bertram M. Mullin

ATTORNEY

FIG. 5

| | A | | | | | B | | | |
|---|---|---|---|---|---|---|---|---|---|
| SUBSTRATE TEMP | $H_o$ | $H_{ko}$ | $\alpha_{90}$ | $\beta$ | SUBSTRATE TEMP | $H_o$ | $H_{ko}$ | $\alpha_{90}$ | $\beta$ |
| 250°C | 1.4 | 3.0 | 1.5° | 3.5° | 250°C | 1.0 | 2.9 | 0.5° | 1.5° |
| 300°C | 2.1 | 2.5 | 2° | 3.0° | 300°C | 1.6 | 2.6 | 1° | 1.5° |
| 325°C | 2.1 | 2.9 | 1.5° | 5.5° | 325°C | 2.0 | 2.4 | 2° | 1.0° |
| | | | | | 350°C | 3.0 | 2.3 | 5° | 1.5° |

| | C | | | | | D | | | |
|---|---|---|---|---|---|---|---|---|---|
| SUBSTRATE TEMP | $H_o$ | $H_{ko}$ | $\alpha_{90}$ | $\beta$ | SUBSTRATE TEMP | $H_o$ | $H_{ko}$ | $\alpha_{90}$ | $\beta$ |
| 200°C | 1.5 | 2.3 | 3° | 1.9° | 250°C | 1.3 | 1.4 | 4.5° | 3.0° |
| 250°C | 1.15 | 2.2 | 1.5° | 0.3° | 300°C | 1.05 | 0.8 | 9° | 5.0° |
| 300°C | 1.3 | 1.7 | 3° | 5.0° | 350°C | 0.9 | 0.65 | 17° | 10° |
| | | | | | | | | | |

United States Patent Office 3,540,864
Patented Nov. 17, 1970

3,540,864
MAGNETIC COMPOSITION

Barry L. Flur and Andrew J. Griest, Burlington, Vt., assignors to International Business Machines Corporation, Armonk, N.Y., a corporation of New York

Original application Nov. 15, 1965, Ser. No. 507,847, now Patent No. 3,399,129, dated Aug. 27, 1968. Divided and this application June 17, 1968, Ser. No. 802,297
Int. Cl. B32b *15/00*
U.S. Cl. 29—195 3 Claims

ABSTRACT OF THE DISCLOSURE

Alloys suitable for magnetic film memories contain from about 70 to 80 percent by weight nickel, 10 to 20 percent by weight iron and 3 to 20 weight percent manganese and are non-magnetostrictive. Magnetic films made of these alloys exhibit a wide range of magnetic property combinations by varying compositions within these ranges and varying temperatures of substrates on which the magnetic films are deposited. With some compositions, wall motion threshold ($H_0$) increases with increasing substrate temperature. With other compositions within the above range, $H_0$ decreases with increasing substrate temperature.

This invention relates to multi-component magnetic thin films of the type that find application in computers and, in particular, to nickel-iron-manganese magnetic thin films and to the method for producing the same.

This is a divisional application of U.S. patent application 507,847 of B. L. Flur and A. J. Griest, filed Nov. 15, 1965, now Pat. No. 3,399,129 wherein the assignee of the parent application is the same as that of the present instant application.

Ferromagnetic thin films are finding wide application as storage and switching devices in data processing and computer machines. Much of this activity stems from the discovery by M. S. Blois, Jr. in 1955 that uniaxial anisotropy is readily induced in thin films of 80:20 (by weight) nickel-iron when the film is vacuum deposited in the presence of a magnetic orienting field, see J. Appl. Phys. 26 No. 8, 975 (1955). These magnetic thin films potentially offer both engineering and economical advantages over present storage and switching devices. The anisotropy induced in these films provide an easy axis of magnetization, aligned parallel to the externally applied field, along which two stable states corresponding to positive and negative remanence are available, and a domain structure which allows rapid rotation of the magnetic remanence from one stable state to the other.

Storage or switching of intelligence is achieved by magnetizing a particular element or "bit" in an array or matrix of such elements into either one or the other of its stable states. Rotation of the magnetization takes place upon application of the required switching field from one stable state to the other in short periods of time in the order of nanoseconds ($10^{-9}$ seconds). Characteristics such as these lend themselves to the applications as heretofore described.

In addition to exhibiting a uniaxial anisotropy, accompanied by a low value of anisotropy field, and reversing magnetization alignments rapidly, it is desirable that the magnetic thin film possess a number of other characteristics: a low and preferably an essentially zero magnetostriction in order to reduce film sensitivity to stress; a relatively high value of wall motion coercive force, to minimize domain wall creep and to impede magnetization reversal by domain wall movement; low random anisotropics in order to decrease special dispersion of the preferred direction of magnetization; a remanent magnetization sufficiently high to insure adequate signal output; a Curie temperature well in excess of the deposition and service temperatures; uniformity of magnetic properties over the surface of the film to insure predictability of device performance; both metallurgical and magnetic stability to operational environment; and economy and feasibility of fabrication. To date the simple binary Permalloy containing about 81 percent by weight nickel, with the balance being iron, forms the predominant material from which magnetic thin films are produced. While this material does satisfy many of the requirements heretofore given, the simple binary alloy does not offer the degree of flexibility and the freedom in the choice of process variables with respect to all the material properties of the film that are now desired for computer applications.

What is sought is a magnetic thin film material system that offers a wide range of magnetic and electrical properties. In the search for a solution to this problem, attention has focused on the multi-component alloy systems and, in particular, on the ternary alloy systems. One such ternary alloy system investigated is that of nickel-iron-cobalt, see E. M. Bradley, J. Appl. Phys., Supplement to volume 33, 1051–1057, March 1962. Although cobalt additions to nickel-iron are desirable in that wall motion-coercive force is increased, unfortunately the anisotropy field is also increased proportionally. From the work of F. Kaya, M. Nakayama and H. P. Sato, as reported in The Proceedings Physico, Mathematical Society of Japan, volume 23, Series 3, 179 (1943) it would appear that the nickel-iron-manganese ternary system lends itself to employment as a magnetic thin film material. But since little is known of the structure of these ternary alloy materials in bulk, and further since difficulties are encountered in working with this ternary alloy system, no one has proposed a satisfactory generally applicable method for forming a magnetic thin film from the nickel-iron-manganese ternary system and produce the same with those properties desired for computer applications. As a result it has been necessary to continue to use the simple binary Permalloy alloy material for the formation of magnetic thin films, even though higher order properties or other combinations of properties are sought for the application.

The present invention is based on the discovery that a magnetic thin film formed from the nickel-iron manganese ternary alloy system where the concentration of each of the metal constituents in the magnetic thin film is maintained within predetermined proportions, provides a storage and switching medium for computer applications that is characterized by a unique combination of properties, that are of an order entirely different from and higher than that presently available with other magnetic thin film alloy systems. To produce the magnetic thin film from the nickel-iron-manganese ternary system, resort is had to the process of bias sputtering which process is the subject of U.S. patent application Ser. No. 402,800 to Leon I. Maissel, Barry L. Flur and Bruce I. Bertelsen, which patent application is assigned to the assignee of the instant patent application, now Pat. No. 3,303,116. A wide range of properties are thus furnished in a series of compositions, permitting the processing of magnetic thin films by techniques that utilize complex temperature cycles and permitting the adaptation of such films in computer environments calling for involved behavior patterns.

It is a primary object of this invention to provide an improved magnetic thin film alloy possessing improved magnetic properties of the type finding application in computer and data processing machines.

It is a further object of this invention to provide an improved magnetic thin film material from the nickel-iron-manganese ternary alloy system.

It is yet another object of this invention to provide an improved process for forming magnetic thin films from the nickel-iron-manganese ternary alloy system.

It is yet another object of this invention to provide an economical and commercially feasible process for cathodically sputtering magnetic thin films from the nickel-iron-manganese ternary system for use in data processing and computer machines.

The foregoing and other objects, features and advantages of the invention will be apparent from the following more particular description of preferred embodiments of the invention is illustrated in the accompanying drawings.

Figures 1, 2:
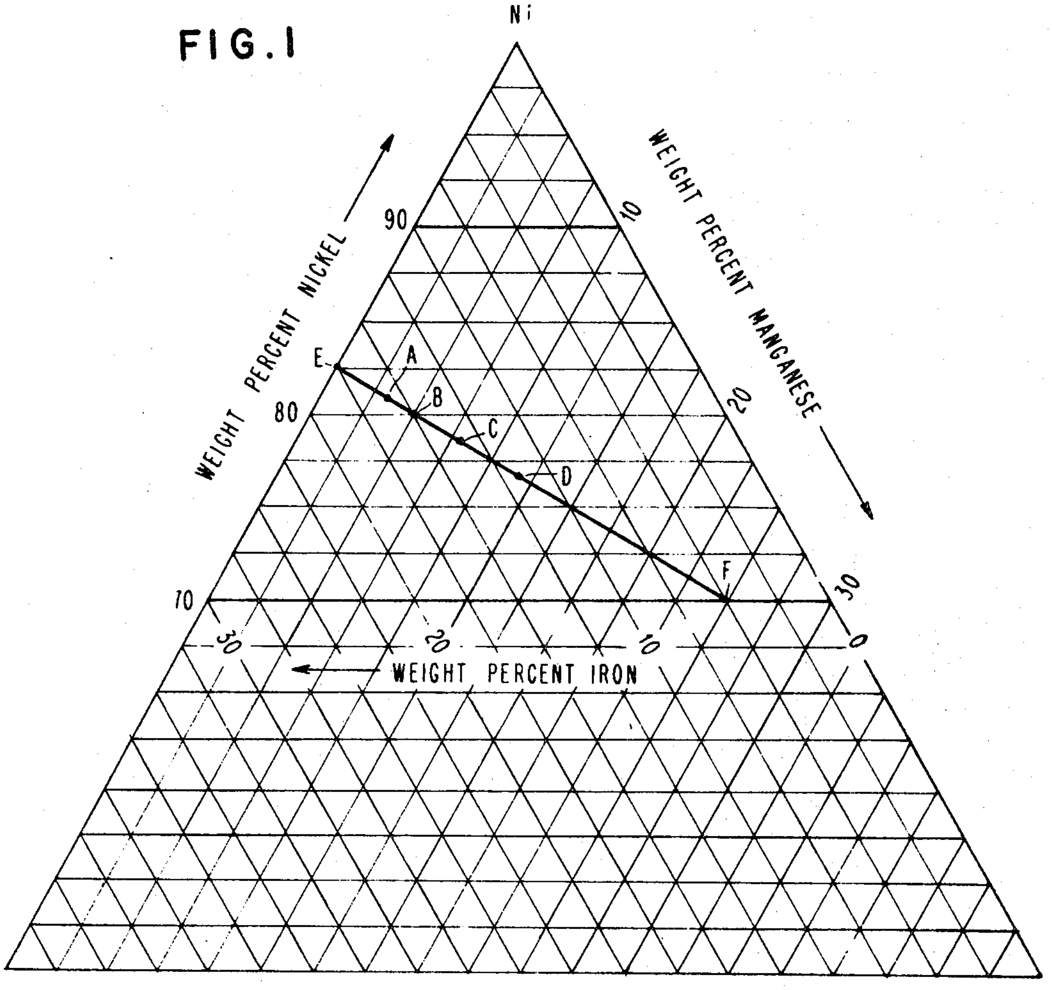
FIG. 1 is a ternary diagram showing diagrammatically the range of nickel, iron and manganese contemplated in the present invention.
FIG. 2 is a table depicting the coordinates of Curve EABCDF of FIG. 1.

FIG. 5 presents magnetic properties in tabular form of a thin film illustrating the improved properties available in accordance with the present invention.

Generally speaking, the present invention utilizes the nickel-iron-manganese ternary alloy systems to furnish magnetic thin films having improved magnetic properties for computer applications. The magnetic thin films from the nickel-iron-manganese ternary alloy system contain from about 70 to 80 weight percent nickel, from about 10 to 20 weight percent iron, and from about 3 to 20 weight percent manganese. Preferred non-magnetostrictive compositions for the magnetic thin film include nickel, iron and manganese in the proportions that follow along curve EABCDF of FIG. 1 of the drawing; coordinates of the points for that curve are found in the table of FIG. 2. The crystallite size of the magnetic thin film in accordance with the instant invention as determined by electron microscopy techniques falls in the range between 200 to 1000 A., and, in the main, in the range between 400 to 700 A. From electron diffraction studies, it is found that these films have a face-centered cubic crystal structure with the [110] direction lying normal to the surface of the substrate, while in the plane of the film the crystallites assume a random orientation. The crystallites are spherically shaped but as the manganese concentration increases, the propensity toward sphericity decreases. The microstructure of the magnetic thin films exhibits a homogeneous single phase structure with the manganese being in solid solution in the nickel-iron phase. These films have a magnetization saturation value ($M_s$) between 600 to 1100 gauss. Further it is found that the uppermost layer of a film is an oxide layer, of less than 90 A. in thickness, including the oxides of nickel, iron and manganese with the former being NiO and FeO.

Now, since the high vapor pressure of manganese prohibits a single source evaporation of nickel-iron-manganese films, the magnetic thin film is formed in accordance with the present invention by the bias sputtering technique of Leon I. Maissel, Barry L. Flur and Bruce I. Bertelsen, supra, from pre-alloyed cathodes of the nickel-iron-manganese ternary system formed within the proportions and concentrations heretofore given. As with conventional cathode sputtering, the technique entails mounting two parallel plates in spaced relationship in an enclosed chamber maintained at a pressure between $10^{-1}$ to $10^{-7}$ torr. A cathode of the selected composition from the nickel-iron-manganese ternary system is placed about one plate, the cathode, and the substrate, that is the surface upon which the sputtered atoms are collected, in placed about the second plate, the anode. Both plates are then coupled to DC voltage source of several thousand volts. In the usual cathode sputtering process positive ions are then produced in a glow discharge that is impressed between the plates, and the ions accelerated toward the cathode to eject atoms from the surface thereof. The substrate, during deposition, is either floating electrically or is at the same potential as the anode. Now, with bias sputtering, a small negative bias that is relative to the anode, is applied to the substrate. An ion sheath surrounds the substrate and promotes the desired growth mechanisms for the formation of a magnetic thin film that is characterized by uniform and low values of wall motion coercive force, $H_0$, anisotropy field, $H_{k0}$, dispersion, $\alpha_{90}$, and skew $\beta$.

By utilizing bias sputtering to form a magnetic thin film from a multi-component system such as that of the nickel-iron-manganese ternary alloy system, a number of unique advantages are derived. For one, the chemical composition of the sputtered film is essentially the same as that of the cathode, even though the components of the nickel-iron-manganese cathode differ considerably in their relative sputtering rates. This comes about from compensating mechanisms available with sputtering. To amplify briefly, the very first time that sputtering is achieved from the nickel-iron-manganese cathode, the components with the highest sputtering rate will come off faster, but a so-called "altered region" soon forms at the surface of the cathode. This region is relatively depleted in the higher sputtering rate component so that any subsequent deposits have the composition of the parent alloy. A similar situation does not occur with vacuum, evaporation techniques: at the high temperatures involved in vacuum deposition, the depletion of the higher vapor pressure component from the surface is readily made up by diffusion from a bulk material. A net fractional distillation of the higher vapor component thus occurs. This gives rise to difficulties in forming a magnetic thin film from a ternary alloy system such as that under discussion.

Figures 3, 4:
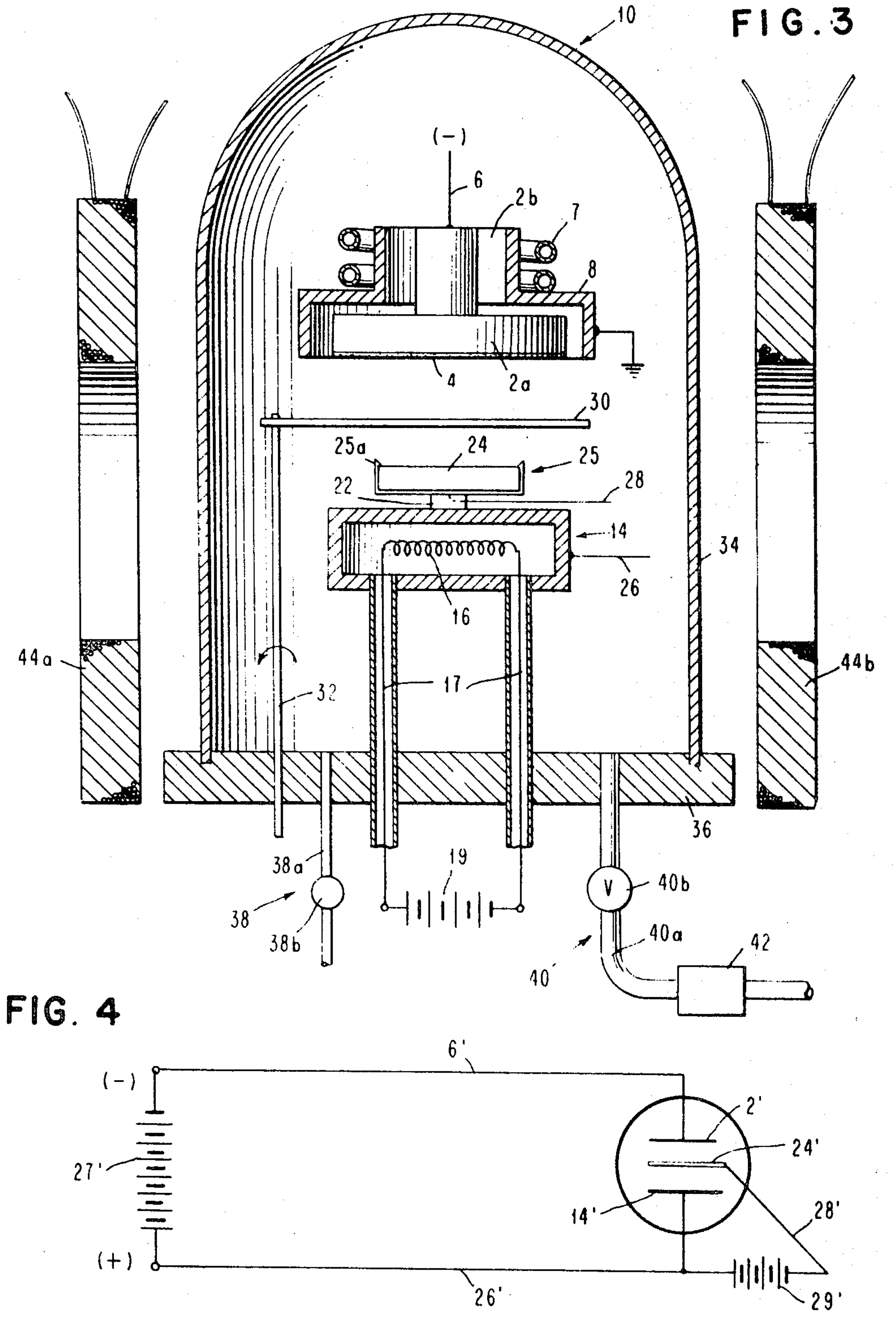
FIG. 3 is a schematic representation of the cathode sputterering apparatus used to form the magnetic thin film of the present invention.
FIG. 4 is a schematic illustration of the electrical connections to the apparatus of FIG. 3 to cathodically sputter magnetic thin films with application of a bias to the substrate.

To further assist in the description of the present invention, reference is now made to FIG. 3 of the drawings which schematically illustrates the general type of apparatus, depicted as numeral 10, utilized in the sputtering of the magnetic thin film from the nickel-iron-manganese ternary alloy system. Apparatus 10 includes a first electrode 2 having a lower portion **2*a* which is contiguous to the mass of the upper portion 2*b*. Rapid withdrawal of thermal energy from the face of electrode 2 is facilitated by the high conductivity of 2*a* and 2*b* and the large radiating surface dissipating heat to the cooling shield 8 hereafter described. Fastened to the surface of cathode assembly 2 is a thin foil of ferromagnetic material, the target 4, which is composed of a selected composition from the nickel-iron-manganese ternary alloy system. Also coupled to the cathode assembly 2 is the negative lead 6 of a voltage source (not shown). Shield 8, having cooling coil 7 about its periphery, is positioned around cathode assembly 2** within the Crookes dark space distance from the cathode. The Crookes dark space is a well known term in the art and described in Vacuum Deposition of Thin Films by L. Holland, pp. 80–82, 1961 edition.

Below cathode assembly 2 in substantially parallel spaced relation thereto is anode assembly 14 which includes a housing containing a heating coil 16. Leads 17 couple coil 16 to power source 19. On the surface of the anode assembly is support 22, preferably glass, which serves to prevent substrate 24 from making contact with the anode. In the particular apparatus utilized, a spacing of 2.5 centimeters is maintained between cathode and substrate but any convenient spacing is permissible, providing that spacing is maintained at a distance greater than the dark space. Anode assembly 14 is grounded via a lead 26 while the film that condenses on the substrate 24 is electrically biased, as required via lead 28 which is coupled to clip 25, the upper extremities **25*a* of which touch the surface of support 22**.

Positioned between cathode assembly 2 and anode assembly 14 is rotatable shutter 30 which is placed between cathode 2 and anode 14 during the presputtering cleaning of the cathode. This is done to assure the removal of all contaminants from the surface of the ferromagnetic target 4. Once the precleaning step is performed, shaft 32 rotates shutter 30 away from its station between cathode 2 and anode assembly 14, thus leaving the ferromagnetic target 4 facing anode assembly 14.

Enclosing the electrodes is bell jar 34 which in the particular arrangement employed has a diameter of about 18 inches; bell jar 34 rests on the base member 36 and contains two ports 38 and 40. The first port 38 is an inlet for a suitable gas via conduit **38*a* and control valve 38*b*. Argon, for example, furnishes the necessary ionized particles for bombarding the surface of the cathode. The second port 40 serves to connect a second conduit 40*a* which includes valve 40*b*, facilitating regulation and control, and is coupled to vacuum pump 42. The pressure within bell jar 34 is maintained at about 0.1 torr during the sputtering operation. Uniaxial anisotropy is induced in the resultant sputtered film by activation of coils 44*a* and 44*b*** which produce a uniform magnetic field in the vicinity of the glow discharge. Relatively large coils are required in order to obtain the desired anisotropy.

FIG. 4 schematically shows the electrical connections required to operate the apparatus of FIG. 3. In FIG. 4, 2′ designates the cathode, 24′ the substrate, and 14′ the anode. Note that the cathode is coupled to the negative terminal of the power source 27′ by way of lead 6′, that the anode is coupled to the positive terminal of the power source 27′ by way of line 26′ and that the substrate film is biased negatively by source 29′ coupled to the substrate by way of line 28′.

Now, to further illustrate the practice of the invention, a specific example is given. A vacuum melted and rolled 12.5 centimeter square nickel-iron-manganese sheet having a composition containing about 76 percent by weight nickel, 12 percent by weight iron, and 12 percent by weight manganese is bonded to the surface of cathode assembly 2 to provide target 4 of FIG. 3. The thickness of target 4 is desirably kept under 30 mils and, preferably under 10 mils, in order to avoid the ferromagnetic fields emanating from the target material which, if present to any degree, distorts the field produced by coils **44*a* and 44*b*. Substrate 24 is mounted on support 22**; the substrate in the particular example given is a metallographically polished 2 inch square plate of silver-copper alloy that contains about 80 percent by weight silver and the balance copper. The substrate has an overlayer of chromium of a thickness between 400 to 1000 A. and a silicon monoxide layer superimposed over the chromium of a thickness between 1 to 4 microns.

After the pressure within chamber 34 is reduced to the necessary level, argon is injected by way of port 38 to a pressure of approximately 0.1 torr to provide the bombarding media for sputtering target 4. Heating coil 16 is energized to provide a uniform temperature profile over the surface of the substrate. With shutter 30 interposed between cathode 2 and substrate 24, target 4 is cleaned by presputtering techniques, which are well known in the art, to remove contaminants from the surface of the target. Once the cathode cleanup is completed, shaft 32 rotates shutter 30 away from its intermediary position thus leaving the face of target 4 exposed to substrate 24. Deposition temperature is measured during the sputtering operation with a thermal couple in spring-loaded contact with the substrate. Thereafter a potential, for example of about 2000 volts, is impressed between cathode and anode with a cathode current of about 110 milliamperes. Once the glow discharge is initiated, coils **44*a* and 44*b* are energized to induce a magnetic field of about 25 oerateds parallel to the surface of the condensing film to induce the desired magnetic anisotropy. After ferromagnetic target 4** has undergone bombardment for a predetermined period to permit the condensation of a continuous layer over the substrate, of about 75 A. in thickness which requires about 15 seconds, a negative bias of 150 volts is applied to the condensing film for the remainder of the deposition. With a substrate, such as that used in the instant example, which includes an exposed surface of silicon monoxides surrounded by a perimeter of metal, it is necessary to delay the bias until a continuous film of sputtered atoms condenses on the silicon monoxide: the exposed metal that forms the border about the silicon monoxide gives rise to preferential entrapment of contaminants if the bias is applied before a continuous layer of sputtered atoms has collected over the surface of the silicon monoxide. The process requires from about 70 seconds to about 140 seconds to form a magnetic thin film with a thickness between 700 to 1000 A.

With nickel-iron-manganese magnetic thin films, a wide range of magnetic properties are available offering a range of flexibility and a degree of freedom in the design of computer storage and switching components heretofore not available. FIG. 5 which includes Tables A, B, C and D, where the values for wall motion threshold $H_o$, anisotropy field $H_{ko}$, dispersion $\alpha_{90}$ and skew, $\beta$, of the curve EABCDF or FIG. 1 are presented, brings this out. Measurements of wall motion threshold $H_o$, anisotropy field $H_{ko}$, dispersion and skew were made with a 60 cycle Kerr effect loop tracer having a light spot dimensions of less than 2 millimeters. Measurements were taken at the centers and the four edges of each film specimen, which were about 500 A. in thickness, and the mean value of these is presented in the Tables. Wall motion threshold $H_o$ was taken as the field necessary to initiate hysteresis in the easy direction B-H loop; anisotropy field $H_{ko}$ was measured from the cross field loop by the technique described by H. J. Kump in The Proceedings of he Intermag Conference, Paper 12–5, Washington, D.C., 1963, in a paper entitled "The Anisotropy Field and Angular Dispersion of Permalloy Films" and, angular dispersion of the easy axis was determined by the technique described by T. F. Crowther in MIT Lincoln Lab Group Report 51–2, Astia-255697 1960 "Technique for Measuring the Angular Dispersion of the Easy Axis of Magnetic Films." These magnetic properties are most significant in evaluating' the usefulness of a magnetic thin film for computer and data processing applications.

By varying the composition within the nickel-iron-manganese ternary system and varying temperature of the substrate, a wide range of magnetic property combinations are available. For example, near the A and B compositional ranges, wall motion threshold $H_0$ increases with increase in substrate temperature. Near the D composition range, $H_0$ decreases with increasing temperature while near the C compositional range it appears that $H_0$ is relatively independent of substrate temperature. Further, low values of skew, particularly, near the B compositional range, result in the magnetic thin film. Also note that these various combinations are available with an anisotropy field ($H_{ko}$) of less than 1 oersted.

Now, while the properties heretofore discussed were obtained for magnetic thin films that were formed on heated substrates, and, generally on substrates that were maintained at a temperature in the range between 200° to 450° C., it is to be noted that the practice of the invention is not limited to this particular temperature range. In practice it is found that useful magnetic thin films are realized for films formed on substrates that are heated to temperatures above or below the range given or for films formed on substrates that are cooled. In essence, it is found that the availability of useful magnetic thin films is more a function of the degree to which a uniform temperature profile is maintained over the substrate surface than the temperature to which the substrate is heated or cooled.

What has been described is a new class of compositions from the nickel-iron-manganese ternary system for adaptation as a magnetic thin film material. Magnetic thin films so formed exhibit a unique combination of properties heretofore not available in the art. While in describing the practice of the invention resort was had to an illustrated arrangement for a sputtering apparatus, it will be readily recognized by those skilled in the art that the apparatus is readily modified without departure from the principles described therein. Further it is to be recognized that while in discussion of the processing details for forming the thin film mention was made of particular voltages and currents, it is to be noted that the present invention is not limited to these specific values. For example, the magnitude of the potential difference between cathode and anode of the particular apparatus described may vary from 1500 to 4000 volts, with cathode currents from 80 milliamperes to 250 milliamperes, the limiting factor, in practice, depends upon the amount of heat produced by a high sputtering rate, which might affect the desired growth mechanisms in the thin films, or in the alternative, the lack of economy in a low sputtering rate. Similarly, as to the magnitude of the bias voltage heretofore given, biasing voltages in the range between 100 to 200 volts have been used. The former biasing voltages are preferably used with the lower manganese concentration compositions, whereas the higher voltages are required with increased manganese compositions. Biasing voltages of less than 100 volts are found to give rise to problems in reproducibility and contamination whereas no practical benefit is noted for utilization of biasing voltages that exceed 200 volts. In essence, the magnitude of the biasing voltage need only be sufficient to provide an ion sheath about the substrate to promote the desired growth mechanisms. Likewise, practice of the invention is not confined to bombarding media such as argon but other gases such as helium, neon, krypton, mercury and xenon are amendable to the process.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic element for adaptation as a computer and data processing element comprising a ferromagnetic thin film on a substrate, said thin film consisting essentially of 70 to 80 percent by weight nickel, 10 to 20 percent by weight iron, and 3 to 20 percent by weight manganese and exhibiting essentially nonmagnetostrictive behavior.

2. The magnetic element of claim 1 wherein said element has at least one preferred axis of magnetization.

3. The magnetic element of claim 1 wherein said nickel, iron and manganese are in coordinated amounts falling along Curve EABCDF of FIG. 1 of the drawings.

References Cited

UNITED STATES PATENTS

| | | | |
|---|---|---|---|
| 1,668,115 | 5/1928 | Gumlich | 75—170 |
| 3,303,116 | 2/1967 | Maissel et al. | 148—31.55 |
| 3,385,725 | 5/1968 | Schmeckenbecher | 75—170 |

RICHARD O. DEAN, Primary Examiner

U.S. Cl. X.R.

75—170; 148—31.55; 340—174